United States Patent
Seyfried

(10) Patent No.: US 9,229,294 B2
(45) Date of Patent: Jan. 5, 2016

(54) APPARATUS AND METHOD FOR OPERATING AN ACOUSTO-OPTICAL COMPONENT

(71) Applicant: Leica Microsystems CMS GmbH, Wetzlar (DE)

(72) Inventor: Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 14/185,719

(22) Filed: Feb. 20, 2014

(65) Prior Publication Data

US 2014/0168753 A1    Jun. 19, 2014

Related U.S. Application Data

(63) Continuation of application No. 12/739,943, filed on May 6, 2010, now Pat. No. 8,659,819.

(51) Int. Cl.
*G02F 1/33* (2006.01)

(52) U.S. Cl.
CPC .............. *G02F 1/33* (2013.01); *G02F 2203/60* (2013.01)

(58) Field of Classification Search
CPC ........................................................ G02F 1/33
USPC ......... 359/239, 285, 286, 287, 305, 306, 307, 359/309
See application file for complete search history.

(56) References Cited

U.S. PATENT DOCUMENTS

| 4,272,825 | A | 6/1981 | Smithline et al. |
| 6,411,411 | B1 | 6/2002 | Okazaki et al. |

(Continued)

FOREIGN PATENT DOCUMENTS

| DE | 198 27 140 | 12/1999 |
| DE | 101 15 488 | 12/2001 |

(Continued)

OTHER PUBLICATIONS

English Translation of the International Preliminary Report on Patentability issued for PCT/EP2008/065052 dated Jun. 10, 2010.

(Continued)

*Primary Examiner* — Tuyen Tra

(74) *Attorney, Agent, or Firm* — Schlee IP International, P.C.; Alexander R. Schlee

(57) ABSTRACT

An apparatus for controlling an acousto-optical component influencing at least one of illumination light and detection light in a microscope is described. The apparatus comprises a radio-frequency generator for supplying the acousto-optical component with a radio frequency. The radio-frequency generator is configured to compensate deviations in the characteristics of the light due to temperature fluctuations in the acousto-optical component by adapting the radio frequency. The apparatus can be operated by generating a control signal for controlling the radio frequency of the radio-frequency generator; measuring the temperature of the acousto-optical component; adapting the control signal depending on the measured temperature; and sending the adapted control signal into the radio-frequency generator for compensating deviations in the characteristics of the light due to temperature fluctuations and can be used in optical coherence tomography, particularly white light interferometry, optical tweezers in lithography, and distance measurement.

7 Claims, 2 Drawing Sheets

(56) References Cited

U.S. PATENT DOCUMENTS

| | | | |
|---|---|---|---|
| 6,848,825 B1 | 2/2005 | Simon et al. | |
| 7,580,182 B2 * | 8/2009 | Kump et al. | 359/307 |
| 8,659,819 B2 * | 2/2014 | Seyfried | 359/305 |
| 2003/0021018 A1 | 1/2003 | Birk et al. | |
| 2004/0105485 A1 | 6/2004 | Bures et al. | |
| 2004/0174585 A1 | 9/2004 | Birk | |
| 2008/0180782 A1 | 7/2008 | Kump et al. | |
| 2009/0086315 A1 | 4/2009 | Birk et al. | |

FOREIGN PATENT DOCUMENTS

| | | |
|---|---|---|
| DE | 101 37 154 | 2/2003 |
| DE | 101 37 155 | 2/2003 |
| DE | 103 24 331 | 12/2004 |
| EP | 0 834 762 | 4/1998 |
| EP | 1 591 825 | 11/2005 |
| JP | 2002-148556 | 5/2002 |

OTHER PUBLICATIONS

NonFinal Office Action issued in U.S. Appl. No. 12/739,943 dated Feb. 13, 2012.
Reply to NonFinal Office Action issued in U.S. Appl. No. 12/739,943 dated Feb. 13, 2012.
NonFinal Office Action issued in U.S. Appl. No. 12/739,943 dated Oct. 31, 2012.
Reply to NonFinal Office Action issued in U.S. Appl. No. 12/739,943 dated Oct. 31, 2012.
NonFinal Office Action issued in U.S. Appl. No. 12/739,943 dated May 7, 2013.
Reply to NonFinal Office Action issued in U.S. Appl. No. 12/739,943 dated May 7, 2013.
Notice of Allowance issued in U.S. Appl. No. 12/739,943 dated Oct. 9, 2013.
Issue fee payment for U.S. Appl. No. 12/739,943 dated Jan. 9, 2014.
Issue Notification for U.S. Appl. No. 12/739,943 (U.S. Pat. No. 8,659,819).

* cited by examiner

APPARATUS AND METHOD FOR OPERATING AN ACOUSTO-OPTICAL COMPONENT

CROSS-REFERENCE TO RELATED APPLICATIONS

This is a Continuation application claiming benefit of the U.S. non-provisional patent application Ser. No. 12/739,943 that is based on the International Patent Application PCT/EP2008/065052 Nov. 6, 2008 that claims the priority of the German patent application DE 102007053199.2 that was filed on Nov. 6, 2007. The entire content of this prior German patent application is herewith incorporated by reference.

BACKGROUND OF THE INVENTION

The invention relates to an apparatus for controlling an acousto-optical component in order to influence light passing through, in particular in order to influence the illumination light and/or the detection light in the beam path of a microscope, preferably a confocal laser scanning microscope, having a radio-frequency generator for supplying the acousto-optical component with a radio frequency. Further, the invention relates to a corresponding method as well as uses and applications of both the apparatus and the method, respectively.

Basically, this is about the control of acousto-optical components in order to influence light passing through. Such components typically comprise an acousto-optical crystal on which an electric transducer is provided. Typically, the transducer comprises a piezoelectric material sandwiched by electrodes. By electrically applying radio frequencies, which are usually in the range of 30 MHz and 800 MHz, to both electrodes the piezoelectric material is oscillated so that an acoustic wave (sound wave) is created which, as a result of the arrangement of the transducer, passes through the crystal. After passing through the optical interaction area the sound wave is usually absorbed or reflected on the opposite crystal side. Acousto-optical crystals as used with the acousto-optical components in question here are characterized in that the created sound wave changes the optical property of the crystal, a diffraction grating or a comparable optically active structure, for example in the form of a hologram, being induced by the sound. Light passing through the crystal is diffracted at the diffraction grating created in this way, the light being directed in different diffraction orders or diffraction directions.

In the acousto-optical components in question here one distinguishes between components which influence the entire incident light more or less independent of the wavelength (e.g. AOM, AOD and frequency shifter) and components which, for example depending on the radio frequencies, selectively act on individual wavelengths (e.g. AOTFs).

Often, the acousto-optical components are comprised of birefringent crystals, such as tellurium dioxide, the position of the crystal axis relative to the plane of incidence of the light and its polarization determining the optical properties of the acousto-optical component.

In specific applications, the light uninfluenced by the diffraction, the light diffracted in different diffraction orders, or both the uninfluenced as well as the diffracted light are optionally used.

In the acousto-optical components known from practice, the radio frequency (RF) is supplied to the acousto-optical component usually via a coaxial cable. Thereat, an impedance matching takes place on an electronic circuit board, wherein care has to be taken that no RF reflections occur. As much RF power as possible should reach the crystal which usually has an impedance different from that of the RF cable. From the electronic circuit board, the radio frequency is forwarded to the transducer on the crystal, where the acoustic wave is created.

In the past, the acousto-optical components in question here, mainly in the case of AOTFs, were mostly used to set and control light intensities. Recently, there is a need to use respective components for "cutting out" specific portions of the light from a more or less spectrally broadband light. With regard thereto, reference is made to DE 101 15 488 A1 by way of example only.

The acousto-optical components in question here serve within the above-mentioned uses mainly to cut out specific spectral portions of a continuous or broadband light source for illumination purposes. By way of example only, reference is made to the use in connection with white light lasers, broadband lasers, ultrashort pulse lasers, superluminescent LEDs or other superluminescent light sources, ASE light sources, bulbs, point source LEDs and others LEDs, sunlight or starlight etc. The optical components also serve to cut out specific spectral light portions for detection purposes, for example for use in programmable spectral filters. Also the use of the acousto-optical component within a programmable beam splitter (AOBS) is of importance. Further, it is known from practice that the acousto-optical components in question here change their behavior over the temperature profile, this being mainly attributed to a change in the velocity of sound in the crystal. If one wishes to use the acousto-optical component at changing temperatures, a compensation of the behavior caused by the change in temperature is necessary. Corresponding compensation methods are already known. These methods suggest to heat or to cool the crystal which is exposed to the temperature fluctuations in order to cause a temperature stabilization at the crystal. For this, a special temperature control is provided. In this respect, reference is also made to EP 0 834 762 A2, according to which some sort of dummy radio frequency is provided which is fed in whenever the actual radio frequency is turned off so that the same heat can always be deposited in the crystal via a heating system.

As an alternative to the above-mentioned method, the radio frequency is adjusted according to a measured change in temperature as specified in DE 198 27 140 C2. However, up to now one assumed that the relevant compensation parameter as well as the radio frequency itself, which is required for operating the acousto-optical component, depends on numerous parameters such as on the wavelength of the light to be diffracted, on the angle of incidence of the light in the crystal, on the mounting conditions of the crystal etc. Therefore, up to now, the amount of the change in frequency has been determined iteratively experimentally, or one compiled tables for the compensation parameters depending on the wavelength and on instrumental conditions. In this connection, it has been necessary to individually determine the compensation parameters for each individual device. In this respect, reference is made in particular to section [0014] of DE 198 27 140 C2.

The effort to be made within the scope of error compensation according to the printed prior art is huge since for each laser wavelength used and possibly for each system used special correction parameters have to be stored and handled. On top of that, it is required to supply the drive electronics with information in order to define which specific laser wavelength and which experimental parameters are present so that the compensation parameter related thereto can be inserted. Consequently, according to the printed prior art the temperature compensation cannot be directly performed by the radio-frequency generator but rather has to be supported or even performed entirely by a higher operating level since for temperature compensation all system information required has to be liquid. This is opposed to a simple operability of the system as well as a fast temperature stabilization on small time scales. Thus, it is, for example, necessary in a confocal microscope to provide a higher software level which has information available as to which laser wavelengths are to be diffracted from the crystal, which provide the necessary compensation parameters for the radio-frequency generator so that the radio-frequency generator can perform the frequency control correctly. Accordingly, the temperature compensation as specified in the printed prior art is not performed by the radio-frequency generator but by the computer controlling the same, which computer—mostly in an unchangeable manner—provides the radio-frequency generator with already temperature-compensated radio frequency nominal values. This results in an enormous complexity and error-proneness of the entire system.

SUMMARY OF THE INVENTION

In the light of the above explanations, the present invention is based on the object to design and develop an apparatus and a method of the generic type such that given changing temperatures an error-free automatic operation is possible while the system has a simple configuration. Moreover, the user need not make any decisions with respect to possible settings or parameters relating to the temperature-dependent error compensation.

According to one aspect of the invention, an apparatus is provided for controlling an acousto-optical component influencing at least one of illumination light and detection light in the beam path of a microscope and passing through the acousto-optical component, said apparatus comprising a radio-frequency generator for supplying the acousto-optical component with a radio frequency, said radio-frequency generator being configured to compensate deviations in the characteristics of the light due to temperature fluctuations in the acousto-optical component by adapting the radio frequency. A method according to the invention for using said apparatus comprises generating a control signal for controlling the radio frequency of the radio-frequency generator; measuring the temperature of the acousto-optical component; adapting the control signal depending on the measured temperature; and sending the adapted control signal into the radio-frequency generator for compensating deviations in the characteristics of the light due to temperature fluctuations. An inventive use of said apparatus and method is in the field of optical coherence tomography, in particular in white light interferometry, optical tweezers in lithography, and distance measurement.

DETAILED DESCRIPTION OF THE INVENTION

According to the invention it has been realized that malfunctions of the acousto-optical component which result from temperature fluctuations can be compensated for in an easy and at the same time ideal manner by adaptation of the radio frequency. This realization is surprising for the experts, if one considers the effort to be made in the relevant prior art. Above all it is surprising that the compensation parameter (in kHz/° C.) required for adjusting the radio frequency only apparently at random depends on all kinds of system parameters such as on the wavelength of the light to be diffracted, on the angle of incidence of the light in the crystal, on the mounting conditions of the crystal, etc. Irrespective of the above-mentioned dependencies it is indeed possible that the compensation parameters are directly and exclusively linked with the radio frequency to be set, the radio frequency itself actually being dependent on numerous parameters in a complex manner. The underlying link for providing a suitable compensation parameter follows a very simple mathematic relationship that is substantially linear except for small corrections.

The above-mentioned inventive realization has quite considerable consequences both with respect to the claimed apparatus and with respect to the claimed method. According to the invention it is possible to directly determine the corresponding compensation value (in kHz/° C.) just from the radio frequency provided for the radio-frequency generator. In other words, the radio-frequency generator can be adjusted just by knowledge of the output radio frequency according to the temperature present at the acousto-optical component.

The idea underlying the invention represents a considerable simplification for the user since during operation of the respective system he/she does not have to take care of the temperature prevailing in the area of the acousto-optical component, in particular not of the crystal temperature. Even the calibration of the system to the correct radio frequencies for operating the respective acousto-optical components can likewise take place under the conditions of the inventive temperature compensation so that the user always sets the correct radio frequencies with respect to a defined standard temperature, and indeed independent of which temperature actually prevails at the acousto-optical component at the time of calibration.

The mathematical relation between the desired radio frequency at a defined temperature and the associated compensation coefficient results in an advantageous manner as follows:

$$\text{compensation coefficient (kHz/° C.)} = a0 + a1*RF + a2*RF2 + a3*RF3 + \ldots + an*RFn$$

Here, n can typically be chosen very small (preferably n<5, but even n=1 already provides an excellent temperature compensation). Mostly, even a0 is almost 0 so that this coefficient, too, can be left out and in the extreme case actually only one single coefficient has to be stored in the radio-frequency generator. Usually, one to at most 5 coefficients are sufficient. From the data amount as well, this is substantially easier than with the tables as specified in the printed prior art, which have to be individually calibrated.

Advantageously, the adaptation of the radio frequency takes place, starting out from a nominal radio frequency, depending on the temperature that can be determined directly at the acousto-optical component. Assuming that the acousto-optical component comprises a crystal that can be changed in its optical properties, it is of a further reaching advantage if a temperature sensor is provided via which the temperature can be determined directly at the crystal. Accordingly, a signal corresponding to the actual temperature at the acousto-optical component is supplied to the radio-frequency generator so that directly thereat a temperature compensation can take place with a simple linear relation to the desired radio frequency taking into account the actual temperature.

As already mentioned, the apparatus according to the invention offers the enormous advantage that the compensation coefficient which serves to adapt the radio frequency can be determined exclusively from the temperature of the acousto-optical component and the nominal radio frequency. Thus, the actual temperature can be continuously determined at the acousto-optical component. In this connection, it is conceivable that a signal corresponding to the actual temperature is directly supplied to the radio-frequency generator or a processor arranged upstream thereof. If the actual temperature is supplied to an upstream processor, this one serves to generate a control signal for the radio-frequency generator. Consequently, the control signal provided by the processor serves to generate a radio frequency on the basis of the respective temperature at the acousto-optical component.

In a particularly easy manner it is also possible that the actual temperature continuously determined at the acousto-optical component is directly supplied in the form of a control signal to the radio-frequency generator for generating the suitable radio frequency on the basis of the respective temperature at the acousto-optical component. In doing so, only digital information is supplied to the radio-frequency generator via the processor, the actual compensation taking place in the radio-frequency generator. In this case, the processor exclusively communicates with the radio-frequency generator, the radio-frequency generator receiving data via the temperature sensor and supplies the required adapted radio frequency to the crystal of the acousto-optical component.

As already mentioned, the apparatus according to the invention can be used to control several acousto-optical components, then as many radio-frequency generators being provided as there are acousto-optical components, which radio-frequency generators are supplied via a common processor with control signals for generating radio frequencies on the basis of the temperature at the respective acousto-optical component. Accordingly, it is conceivable that different acousto-optical components are provided in the system, wherein the acousto-optical component can be an AOTF (acousto-optical tunable filter), an AOD (acousto-optical deflector), an AOM (acousto-optical modulator), a component within a programmable beam splitter, i.e. within an AOTF, a frequency shifter or the like.

Within a merge module the beam combination and an AOTF can serve for intensity control, wherein the components can be arranged in a common housing. Also, two or more acousto-optical components can be combined to an AOBS (programmable beam splitter) within one housing.

Apparatuses according to the invention can be operated in accordance with the afore-mentioned features, in particular when taking into account the claimed method steps.

There are no limits with respect to possible uses of the apparatus according to the invention. The apparatus according to the invention can, for example, be used for temperature compensation in a confocal laser scanning microscope. In this connection, an illumination beam could be guided through a first acousto-optical component having a temperature compensation according to the invention, preferably through an AOTF. The control unit of the confocal microscope then controls, in addition to the confocal microscope, also one or more radio-frequency generators which supply the acousto-optical components with the required radio frequencies. The light diffracted and selected in the first acousto-optical component is preferably guided via an optical fiber to the scanning head of the laser scanning microscope where it is utilized for illumination.

In a particularly advantageous manner, the light is coupled into the microscope via an optical splitter, i.e. via an acousto-optical beam splitter (AOBS). The optical splitter can likewise comprise the inventive temperature compensation which is performed via the radio-frequency generator accordingly.

Further uses are in optical coherence tomography, in white light interferometry, in optical tweezers in lithography, in distance measurement, etc.

There are different possibilities of designing and developing the teaching of the present invention in an advantageous manner. Reference is to be made, on the one hand, to the claims which are dependent on claim 1 and, on the other hand, to the following description of a preferred embodiment of the invention with reference to the drawing. In connection with the description of the preferred embodiment of the invention with reference to the drawing, also generally preferred embodiments and developments of the teaching are described.

DETAILED DESCRIPTION OF THE DRAWINGS

Figure 1:
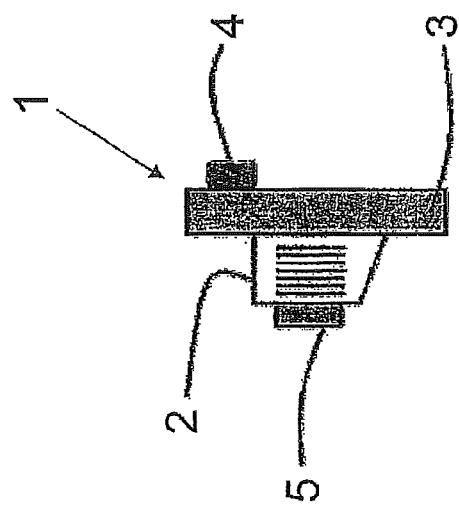
FIG. 1 schematically shows the basic structure of an acousto-optical component.

FIG. 1 schematically shows the basic structure of an acousto-optical component 1 which is controlled by the apparatus according to the invention in a temperature compensating manner. The acousto-optical component 1 comprises an acousto-optical crystal 2 which is arranged on a crystal holder 3. A temperature sensor 4 which is preferably equipped with a digital output is provided directly on the crystal holder 3. On the side of the acousto-optical crystal 2 facing away from the crystal holder 3 a transducer 5 for coupling in the high frequency into the crystal 2 is provided.

Figure 2:
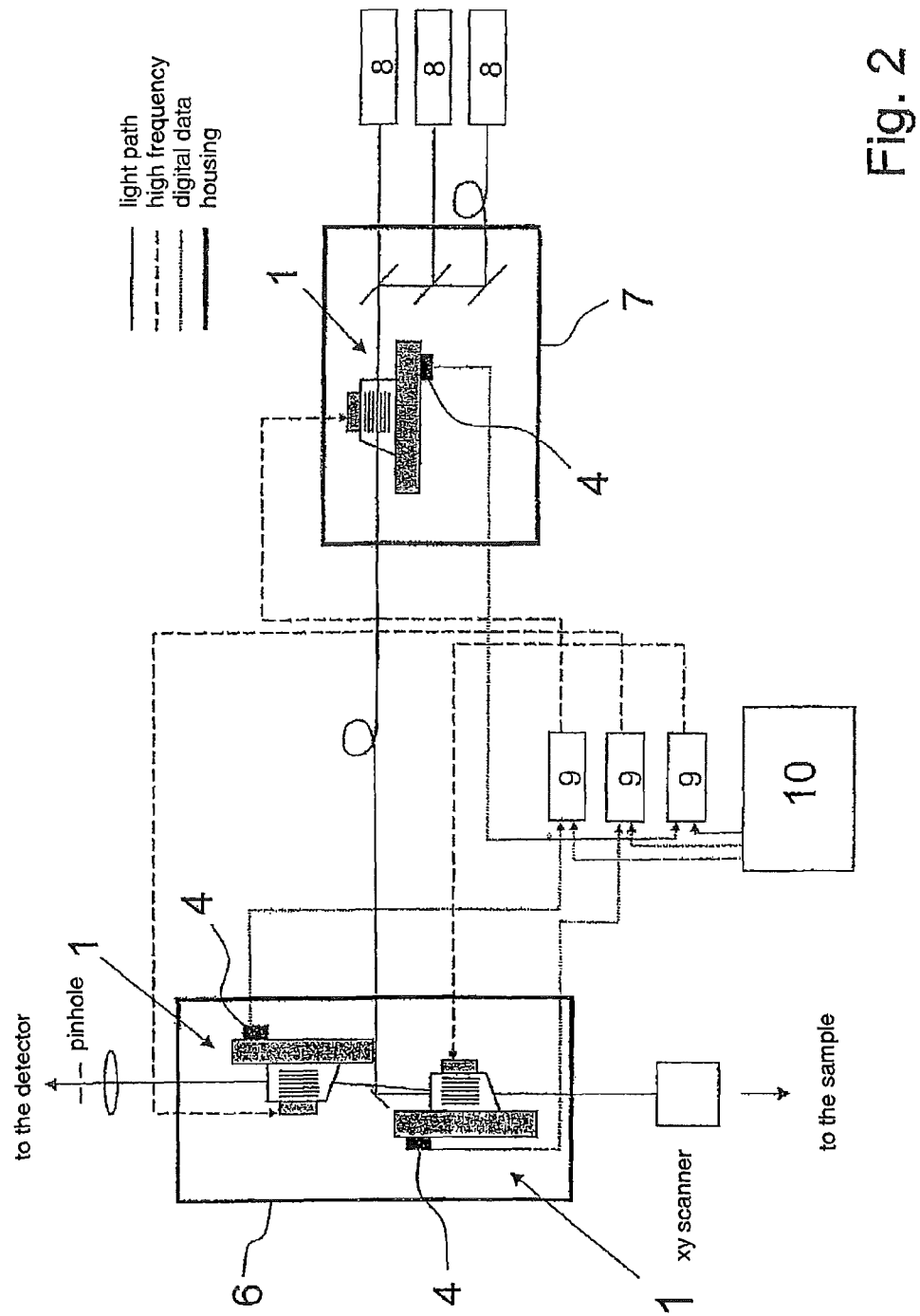
FIG. 2 shows in a schematic diagram the use of the inventive apparatus using the example of a confocal microscope, altogether three acousto-optical components being used.

FIG. 2 shows in a schematic diagram the use of an apparatus according to the invention for controlling altogether three acousto-optical components 1, two of the acousto-optical components 1 forming an AOBS 6 and one further acousto-optical component 1 being arranged in a merge module 7. Within the merge module 7, the beam combination and the AOTF serve for intensity control of the laser light coming from three laser light sources 8 in one common housing.

Altogether three radio-frequency generators 9 which are controlled by a processor 10 or computer with a control signal are provided for controlling the acousto-optical components 1.

The radio-frequency generators 9 receive, on the one hand, control signals via the computer 10 and, on the other hand, temperature-specific signals via the temperature sensors 4 allocated to the acousto-optical components 1 or the crystals 2 thereat so that in the respective radio-frequency generator 9 an adaptation of the radio frequency for temperature compensation can take place.

In the embodiment shown in FIG. 2, the compensation of the malfunction of the acousto-optical component 1 which results from temperature fluctuations takes place in the respective radio-frequency generator 9, and indeed exclusively in due consideration of the respective temperature at the acousto-optical component 1, taking into account the nominal radio frequency provided by the computer 10 with respect to a defined standard temperature at the radio-frequency generator 9. The actual temperature is continuously determined via the temperature sensors 4 and sent to the radio-frequency generator 9. This one continuously calculates new values for the radio frequencies and sends these to the associated acousto-optical component 1 or the crystal 2 thereat.

Finally, it is pointed out that the above-described embodiment merely serves to explain the claimed teaching by way of example but does not restrict the same to the embodiment.

LIST OF REFERENCE SIGNS 1 acousto-optical component
2 acousto-optical crystal 3 crystal holder
4 temperature sensor
5 transducer
6 AOBS
7 merge module
8 laser light source
9 radio-frequency generator
10 processor, computer

The invention claimed is:

1. A method for controlling an acousto-optical component influencing at least one of illumination light and detection light in a beam path of a microscope and passing through the acousto-optical component, comprising a radio-frequency generator for supplying the acousto-optical component with a radio frequency, said radio-frequency generator has such properties that it compensates deviations in a characteristics of the at least one of the illumination light and the detection light due to temperature fluctuations, the method comprising:

generating a control signal for controlling the radio frequency of the radio-frequency generator;

measuring a temperature at the acousto-optical component;

sending a signal corresponding to the temperature measured at the acousto-optical component to the radio-frequency generator and determining a compensation coefficient serving to adapt the radio frequency based on the temperature measured at the acousto-optical component and a nominal radio frequency;

adapting the control signal depending on the compensation coefficient; and sending the adapted control signal into the radio-frequency generator for compensating deviations in the characteristics of the at least one of the illumination light and the detection light due to temperature fluctuations.

2. The method according to claim 1, comprising adapting the radio frequency starting from the nominal radio frequency as a starting point depending on the temperature that can be determined directly at the acousto-optical component.

3. The method according to claim 1, comprising continuously determining the actual temperature of the acousto-optical component and sending a signal corresponding to the actual temperature to a processor for generating a control signal for the radio-frequency generator, wherein the control signal serves to generate a radio frequency based on the respective actual temperature at the acousto-optical component.

4. The method according to claim 1, comprising continuously determining the actual temperature of the acousto-optical component and sending a control signal corresponding to the actual temperature to the radio-frequency generator for generating a radio frequency based on the respective actual temperature at the acousto-optical component.

5. The method according to claim 1, comprising providing several acousto-optical components in the beam path and providing a respective number of radio-frequency generators that are supplied via a common processor with control signals for generating radio frequencies on the basis of the temperature at the respective acousto-optical component.

6. The method according to claim 1, further comprising selecting the acousto-optical component from the group consisting of: an AOTF (acousto-optical tunable filter); an AOD (acousto-optical deflector), an AOM (acousto-optical modulator), a component within a programmable beam splitter, and a frequency shifter.

7. The method according to claim 1, further comprising providing as a microscope a confocal laser scanning microscope.

* * * * *